Jan. 22, 1957 R. A. MAHAFFY ET AL 2,778,177
CONTAINER EVACUATING AND SEALING MACHINE
Filed Nov. 16, 1953 5 Sheets-Sheet 1

INVENTORS
REID A. MAHAFFY
WILLIAM E. YOUNG
JOHN R. HARDER
BY Kenyon & Kenyon
ATTORNEYS

United States Patent Office 2,778,177
Patented Jan. 22, 1957

2,778,177

CONTAINER EVACUATING AND SEALING MACHINE

Reid A. Mahaffy, Cedar Grove, William E. Young, Ramsey, and John R. Harder, Cedar Grove, N. J., assignors to Standard Packaging Corporation, New York, N. Y., a corporation of Virginia Application November 16, 1953, Serial No. 392,120

14 Claims. (Cl. 53—86)

This invention relates to a container evacuating and sealing machine particularly adapted for use for evacuating and sealing flexible bags containing foodstuffs or other commodities.

One of the objects is to provide a machine of simple and relatively inexpensive construction, of the open-bottomed head unit type, using a limited number of heads, such as one or two heads, but having a production rate approaching closely that of more costly and complicated automatic machines of similar type but using a much larger number of the heads with the heads arranged as a travelling, endless series. Another object is to provide a machine of universal application for the packaging of fluent as well as solid materials. For example, a machine embodying this invention permits the evacuation and sealing of bags containing pickles, sauerkraut and the like, and including a judicious amount of the liquids normally associated with these products, as well as meat, cheese and the like. Other objects may be understood from the following.

A specific example of a machine embodying the invention is illustrated by the accompanying drawings in which.

A dominant feature of this new machine is the table top 1 against which the open-bottomed head unit 2 works. This is the table on top of which the container is placed for evacuation and sealing.

This table top 1 is mounted so that its working surface declines toward the front of the machine at an angle of about 30° to 60° relative to a horizontal level. This table top is supported by a framework 3 at a height convenient for the operator who manually loads the filled but unsealed containers. The angularity of the table top 1 should not closely approach the vertical but it should be adequate to cause the containers to gravitationally slide downwardly due to the declination. The table top 1 may be made with a working surface that is smooth and flat, and when the containers are in the form of flexible bags having flat mouths the declination of around 30° to 60° is adequate. An excessive declination angle is disadvantageous because it may result in dearrangement of the product in the container to be evacuated and sealed. For example, shingled cheese slices or other flat food products may be carefully arranged in transparent flexible bags, the indicated declination angularities being insufficient to dearrange gravitationally this kind of load. However, an angularity approaching the vertical does result in such dearrangement so as to prevent the production of an attractive package.

The head 2 is pivoted to the table top 1 near the upper portion of the table by brackets 4 so that the head may be opened and closed relative to the table top 1. The head is operated by rods 5 which are pivotally connected to the head 2 a short distance in front of the brackets 4, these rods depending through holes 6 formed in the table top and being interconnected beneath the table top by a cross head 7. This cross head is operated by a rod 8 which extends to the bottom of the framework 3 where the rod pivotally connects with a foot lever 9 having one end pivotally connected to the rear of the framework. A spring 10 encircles the lower portion of the rod 8 and is arranged to bias the latter upwardly so as to thereby bias the head 2 to its open position. Depression of the foot lever 9 moves the head 2 to its closed position against the force of the spring 10.

Both the brackets 4 and the rods 5 connect with the sides of the head 2 adjacent to the rear portion of these sides. All of these parts are free from the sliding path of containers placed on the table top 1 beneath the head 2.

Reasonable means are provided for holding the container stationary on the surface provided by the table top 1. In one form this means comprises a plurality of ducts or holes 11 formed through the table top and connected by piping with a suitable means for sucking air through these holes 11. Such means may comprise a tank kept in an evacuated condition by a vacuum pump. When the air is being sucked downwardly through the holes 11 and the operator places a container on the table top 1 the container is sucked against the declining or slanting surface so as to be frictionally held substantially immovably thereagainst. When the suction is terminated the container is freed and it automatically slides down the table top and is thus automatically removed from the machine in a simple manner eliminating the need for complicated arrangements.

The declining table top has the further advantage that it permits the evacuation and sealing of a flexible bag containing fluent material. This is possible because the bag may be positioned with its open mouth uppermost and its body depending, or hanging downwardly, sufficiently to avoid spilling the material in the bag. Furthermore, if the bag has a flat mouth made of heat sealable material the load in the bag is maintained free from the inner surface of the mouth so that the latter may be heat sealed.

Figure 3:
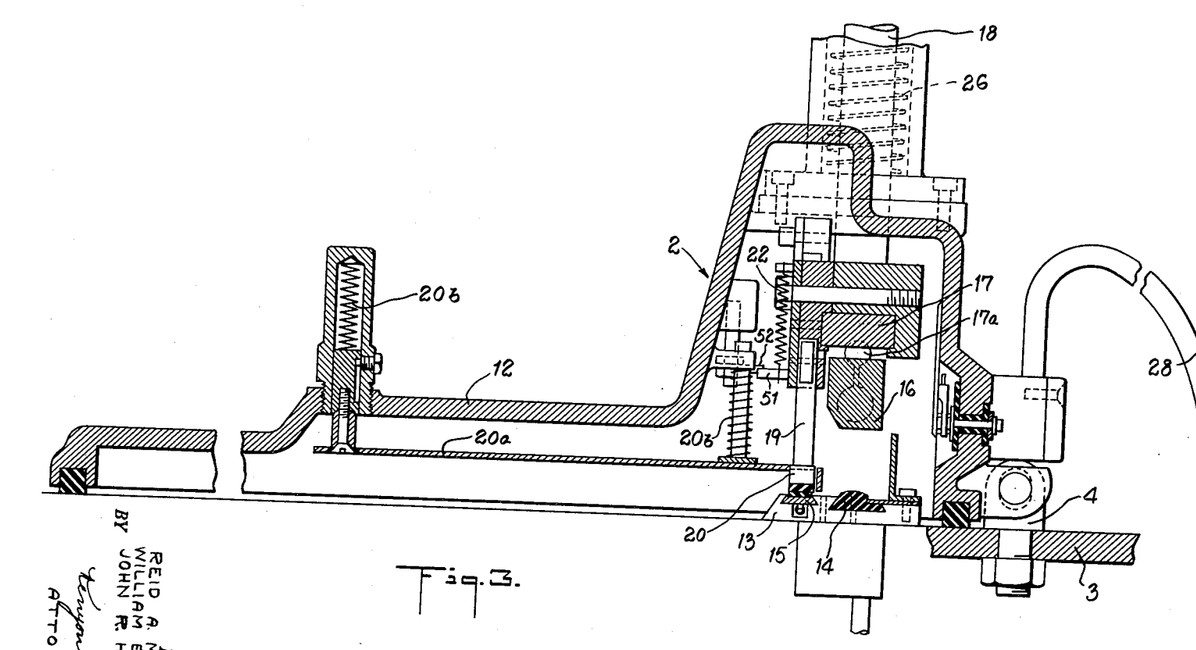
Fig. 3 is a longitudinal vertical cross section of the open-bottomed head unit used by this machine.
Figure 4:
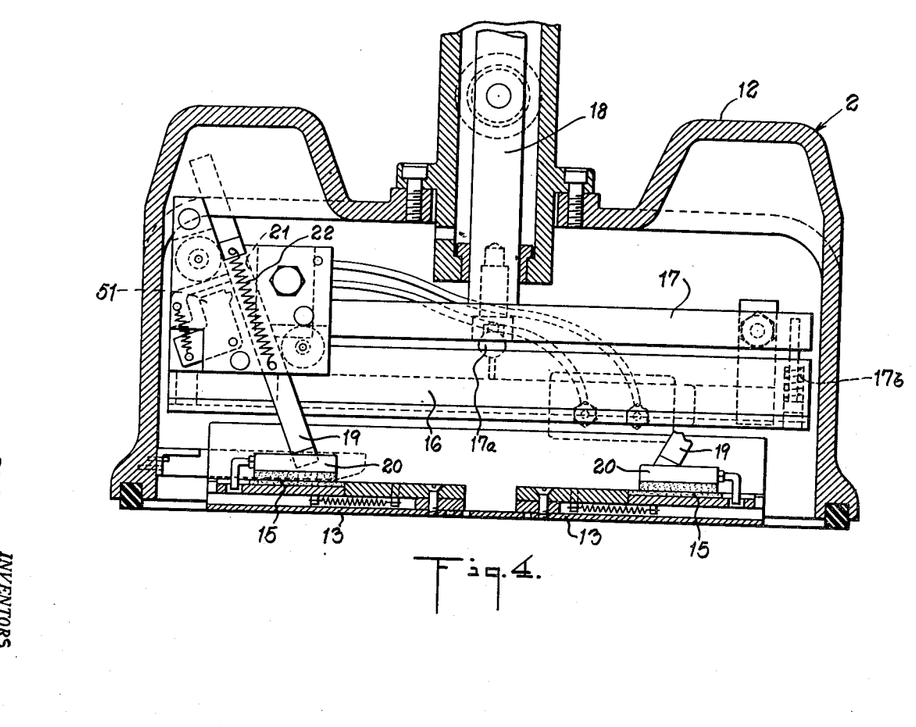
Fig. 4 is a transverse vertical cross section of the head.
Figure 5:
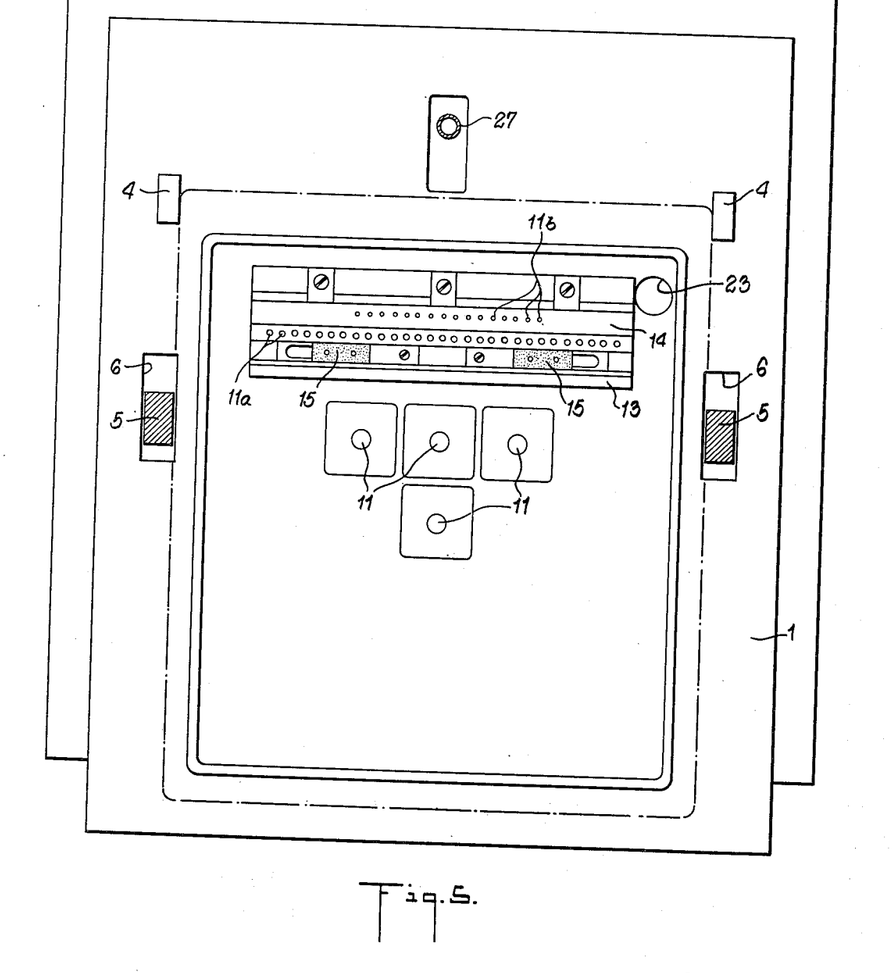
Fig. 5 is a view looking at a right angle towards the machine's table or support against which the head operates.

The open-bottomed head unit 2 is shown in detail by Figs. 3 and 4. It is in the form of an open-bottomed hollow shell 12 of sufficient size to cover the container and to house the sealing equipment. The illustrated machine is particularly intended for use with flat bags having flat mouths and made of flexible material having heat sealing characteristics at least insofar as the inside surfaces of the bag mouths are concerned. These inside surfaces may comprise polyethylene, rubber hydrochloride or the like, and the bag material, on the outside, may be cellophane or the like.

The kind of bags in mind are formed by bending the heat sealing material double on itself and making at least two interspaced transverse heat sealed seams so that by severance through the seams the flat mouth bag is obtained. In using the present machine the bag is first loaded with the foodstuffs or other products and the mouth is unsealed and open. The machine evacuates and heat seals the bags.

Such a bag is laid on the table 1 beneath the head 2 with its open mouth facing upwardly. The top of the declining table 1, relatively close to the brackets 4, is provided with a transversely extended platform 13, shaped and proportioned to permit the entire bag mouth to rest flatly on this platform. A transverse, elastically deformable, heat sealing bar anvil 14 extends longitudinally along the platform 13 and is mounted by the latter. Close to and below this bar 14, pressure finger anvils 15 are positioned by the platform 13, these anvils 15 being arranged for relatively free motion transversely to the bag mouth lying or resting on the platform 13.

The sealing mechanism, mounted in and to the shell 12, comprises a heat sealing bar 16 arranged to reciprocate vertically. This bar is carried by a cross head 17 through a central ball and socket joint 17a. The cross head may be reciprocated vertically by a push rod 18 which connects with the cross head 17 which extends upwardly. Springs 17b at both ends of the cross head and heating bar pull these ends together and keep the joint held together. The arrangement permits the heat sealing bar to have a universal motion for proper seating on its anvil.

The cross head 17 also mounts fingers 19 which extend downwardly and terminate with elastically deformable finger pads 20 positioned to engage the bag mouth above the sliding anvils 15. The bar 17 mounts the fingers 19 by way of inclined guideways 21, and the fingers 19 are spring biased downwardly by tension springs 22. The lower ends of the fingers 19 normally project considerably below the level of the heat sealing bar 16 and so that the finger pads 20 press against the bag mouth top as soon as the head is closed on the table top. Then, downward motion of the cross head 17, required to engage the heat sealing bar 16 with the bag top, causes the finger pads 20 to move outwardly so as to smooth transversely the bag mouth top and free it from possible wrinkles. From the time the head closes and until the sealing bar retracts, the bag mouth top is mechanically gripped between the fingers 20 and the finger anvils 15.

The above arrangement is important because when the head 2 is evacuated, the bag holding suction, drawn through the holes 11, is no longer effective for holding the container or bag against sliding down the declining table. Since the described fingers engage the bag top before the vacuum is drawn inside of the head, the bag is at all times held against sliding down the table until after being evacuated and sealed. When the head opens the bag is then permitted to slide from the table top and into a receptacle below the lower edge of the declining table, or on to a travelling conveyor or the like.

A pressure plate 20a may be mounted in the head and is biased downwardly by springs 20b so as to press on and flatten the bag body. This plate also serves to hold the bag mechanically when the head is evacuated.

The head unit 2 is biased upwardly or to its open position by the compression spring 10. As previously described, depression of the foot lever 9 pulls the head down on the container placed over the holes 11. The table top is provided with a vacuum conduit 23 which opens into the head unit 2 when the latter is closed. As soon as the vacuum is drawn through this conduit opening 23 the head unit is locked down by the atmospheric pressure. The cross head 17, inside of the head unit, is actuated by a piston 24 which works in a cylinder 25 connected to the top of the head unit, the piston 24 connecting with the rod 18. The cross head 17 and the piston 24 are biased to their uppermost position by a compression spring 26 which encircles what may now be called the piston connecting rod 18. The bottom of the cylinder 25 is open to the inside of the head unit 2 and a pipe 27 extends from the top of the piston 25 down to beneath the table top 1. A flexible electric cord 28 carries electric power to the heat sealing bar 16, the latter being heated by an electric resistance element.

With the above arrangement, and with suitable valves and controls presently described, the cycle is arranged so that at the start air is being sucked through the holes 11 continuously. The operator places a bag with its mouth over the various anvil members and so that its closed bottom depends, the suction at the holes 11 promptly anchoring the bag in this position. The operator then depresses the foot lever 9 to close the head and the cycle starts under the control of equipment described later. The vacuum is drawn through the conduit 23 so that the head is locked shut, and at this time the suction connection through the conduits 11 is closed off.

When the head is lowered the finger pads 20 grip the bag mouth below its heat sealing portion so the bag remains positioned. Also the plate 20a helps to hold the bag. At this time the pipe 27 is connected to the top vacuum so there is an equal pressure on the top and bottom of the piston 24, the cross head 17, therefore, remaining at its upper position. After a suitable evacuation time a valve is operated so that the pipe 27 is connected with the atmosphere, this permitting atmospheric pressure to press the piston 24 downwardly and effect the stretching action and heat sealing action. Finally, the conduit 23 is connected with the atmosphere as are also the holes 11, the head then rising and the bag, now evacuated and heat sealed, sliding automatically downwardly from the declining table top. Connection of the holes 11 with atmospheric or greater pressure permits the air to rush in and, in effect, blow the bag loose so it is free to slide.

In the case of fluent materials the location of the holes 11 may be undesirable and, if so, these holes are plugged so as to render them ineffective. The bag may then be held by suction drawn through a transverse series of holes 11a extending through the platform 13 between the two anvils so that the gripping or holding action, effected by the vacuum, extends along the bag mouth at the top portion of the bag. Another series of holes 11b may be arranged up through the heat sealing bar anvil 14 for the same purpose.

Using either or both of the series of holes 11a and 11b, it is possible to lay a bag filled with fluent material, including liquid, on the declining table with the fluent material level below the bag mouth portion. The suction effected through the holes 11a and 11b promptly grips the bag mouth portion and anchors the bag against sliding downwardly. This is an important feature since it makes quick positioning of bags possible when the commodity being packaged is in the form of liquids, partly or entirely, or other fluent materials.

The holes 11a and 11b are of advantage regardless of the material in the bag because their use tends to flatten the bag mouth on the heat sealing anvil. Further, the pressing of the bag mouth against the heat sealing anvil, normally made of rubber-like material, provides for an extra firm holding friction and may eliminate the need for other suction holes such as the holes 11 or even the holes 11a. However, all of the holes may be used together if required.

The holes 11b, which extend through the heating bar anvil, have another interesting and practical advantage. This is that these holes make visible marks in the heat sealed portion of the bag mouth when the heat sealing bar is actuated. The bag's heat seal bears a corresponding series of impressions where the holes did not afford the support during the heat sealing action. Therefore, by arranging the holes 11b in different patterns it is possible to apply code markings to each package automatically and without the need for additional equipment.

Figure 6:
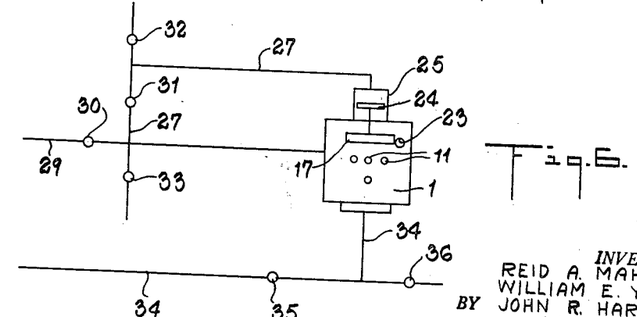
Fig. 6 is a piping diagram.
Figure 7:
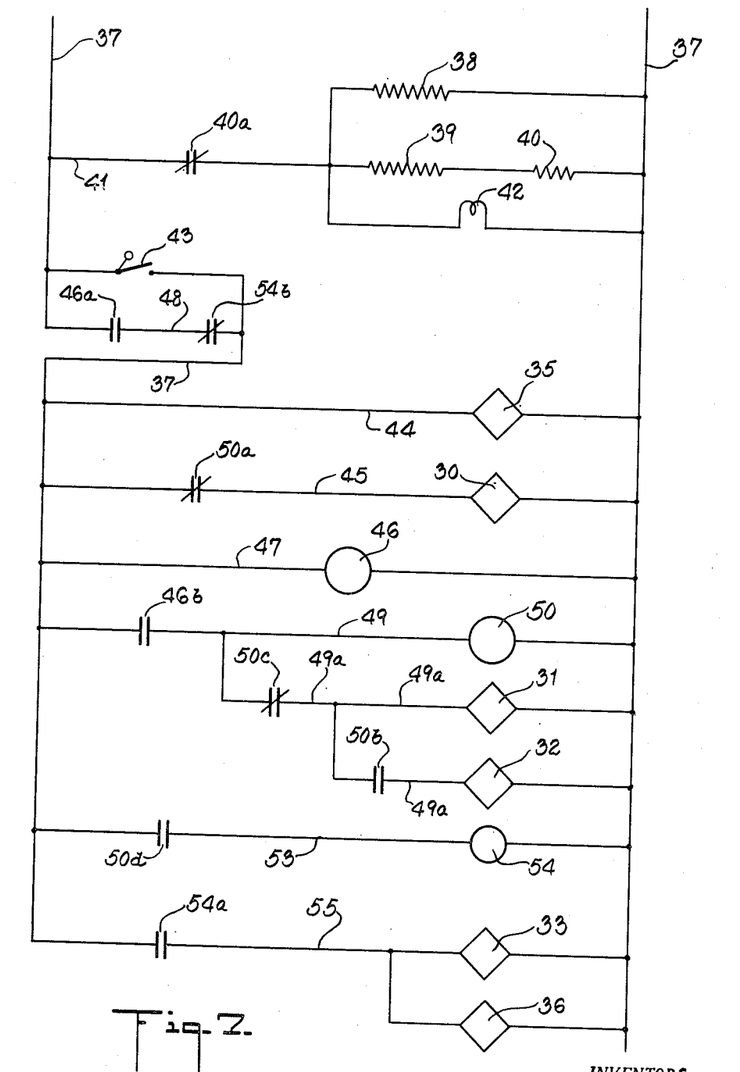
Fig. 7 is a wiring diagram showing how the various functions of the machine are controlled for sequential operation.

The automatic sequence control is shown by Figs. 6 and 7 in a schematic manner.

In Fig. 6 the main vacuum pipe 29 goes to the source of vacuum used to evacuate the packages, this pipe connecting with the conduit 23 opening through the table top 1. The flow through this pipe 29 is controlled by a normally closed, solenoid actuated valve 30, and the pipe 27, connecting with the top of the cylinder 25, connects with the pipe 29 between the valve 30 and the head unit. The connection of the pipe 27 with the pipe 29 is controlled by a normally open, solenoid actuated valve 31, and the pipe 27 may be vented to the atmosphere through a normally closed, solenoid actuated valve 32. A normally closed, solenoid actuated valve 33 is arranged to vent the pipe 29 to the atmosphere at a location between the valve 30 and the head unit.

The vacuum used to hold the containers on the table top need not be so intense as the vacuum used to evacuate the head unit for the purpose of evacuating the container in the head. Therefore, a vacuum pipe 34, separate from the pipe 29, connects with the holes 11, or the holes 11a or 11b as the case may be, and this pipe 34 connects with a suitable source of less intense vacuum. If desired, the same vacuum source may be employed for both holding containers on the table and evacuating the head unit. The pipe 34 is controlled by a normally open, solenoid actuated valve 35 and, at a point between this valve and the holes 11, the pipe 34 may be vented to the atmosphere through a normally closed, solenoid actuated valve 36. This piping and these control valves may be located within the framework 3.

Referring now to the wiring diagram of Fig. 7, power is supplied by two main power lines 37. The electric resistance heating element 38 is the one which heats the heat sealing bar 16, and the electric resistance heating element 39 is a dummy having similar heating characteristics and used to actuate a thermostatic switch 40a controlling the branch line 41 connecting the resistances 38 and 39 with the line 37. The resistance shown at 40 is used to balance the dummy 39 so as to give it the heating characteristics of the resistance 38. An electric bulb 42 shows whether or not the thermostatic switch 40a is closed. The heat sealing bar is kept heated by this arrangement at all times, excepting when the machine is shut down.

Figure 1:
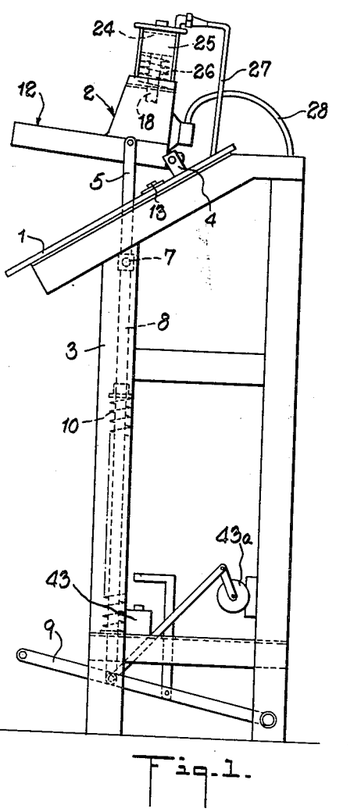
Fig. 1 is a side view of the machine.
Figure 2:
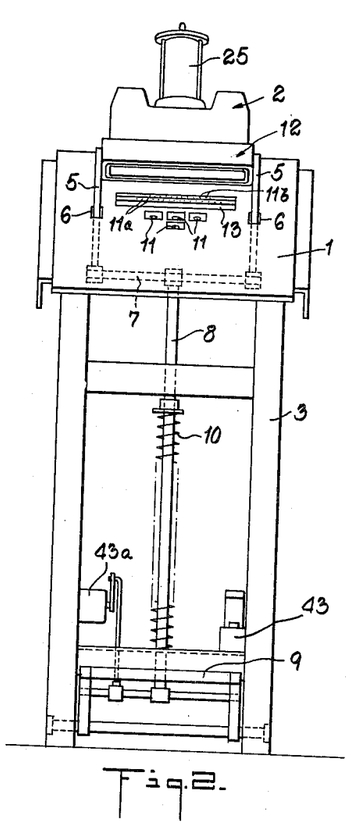
Fig. 2 is a front view of the machine.

The left-hand line 37 is controlled by a limit switch 43 inserted in the line and controlled mechanically so as to close when the foot lever 9 is depressed. The physical location of this switch and its actuating mechanism is shown by Fig. 2. When the foot lever 9 is depressed the switch 43 is closed, along with mechanical closing of the head unit 2, so as to energize the valve 35 to close it and cut off the vacuum sucking through the holes 11. At this time the finger pads 20 are gripping the bag or container and preventing it from sliding down the table. The plate 20a is also performing this function. The valve 35 connects with the lines 37 through a branch line 44.

Simultaneously the valve 30, controlling the main vacuum line 29, is energized by a branch line 45 so that this valve 30 opens and draws a suitably high vacuum inside of the head 2. The atmospheric pressure then locks the head closed so that the foot lever 9 may be released without the head opening.

Also simultaneously the solenoid 46 of a relay is energized by a branch line 47. This instantaneously closes a set of normally open contacts 46a so as to close the circuit through a shunt line 48 going around the limit switch 43 and thus sealing the circuit for so long as the solenoid 46 is energized. Energization of the solenoid 46 also actuates time delay, normally open contacts 46b in a branch line 49, the contacts 46b closing a predetermined time after energization of the solenoid 46. The delay is sufficient to provide for thorough evacuation of the container inside of the head 2. The contacts 46b energize a branch 49a of the line 49 and which is arranged to energize and close the valve 31 which was previously connecting the top of the cylinder 25 with the inside of the head 2. The branch line 49 at this time also energizes the solenoid 50 of a relay so as to instantaneously open a set of normally closed contacts 50a in the line 45 and de-energize the valve 30 so that it closes and cuts off the main vacuum line from the equipment. The solenoid 50 also instantaneously closes normally open contacts 50b in another branch line 49a so as to energize and open the normally closed valve 32 and vent the pipe 27 to the atmosphere. This causes the atmospheric pressure to press the piston 24 and the cross head 17 downwardly and effect the sealing. The valve 32 may vent through a restricted orifice so as to cause the heat sealing to descend at a controlled rate.

After a predetermined time interval, sufficient to permit the heat sealing bar to dwell on the work and effect the heat seal, normally closed, time delay contacts 50c, actuated by the solenoid 50, open in the line 49a so as to de-energize both of the valves 31 and 32. In other words, the valve 31 opens and the valve 32 closes, thus again equalizing the pressure above and below the piston 24 so that the spring 26 returns the piston along with the cross head 17 and the parts carried by this cross head, to their uppermost positions. Extension of the fingers 19 at this time is prevented by latching arrangements 51, also carried by the cross head 17, which hold the fingers upwardly until the cross head 17 moves almost to its uppermost position, at which time the latches are engaged by trips 52 so as to release the fingers 19 so that they are ready for the next cycle.

Normally open, time delay contacts 50d close when the contacts 50c open, these both having been actuated by the solenoid 50, so as to close the circuit through a branch line 53 which energizes the solenoid 54 of a relay. This solenoid 54 instantaneously closes normally open contacts 54a in a branch line 55 connected to energize the solenoid actuated valves 33 and 36 so that these normally closed valves open and vent both the head unit and the holes 11, 11a or 11b.

At this time the effect of the atmospheric pressure on the outside of the head is eliminated and the spring 10 pushes the head to its open position. At this time the air rushes into the holes or ducts 11, 11a and 11b and blows free the bag, the evacuated and sealed bag or other container then sliding down the table 1 and away from the machine.

Since the piston 24 and the head 2 are pneumatically released substantially simultaneously, the cross head 17 rises as the head is about to open. By timing this sequence, as by the weight of the parts and the strengths of their upwardly biasing springs, the cross head can be made to reach a point tripping free the fingers so that they descend and hit against their anvil just as the head starts to rise. Thus the shock of stopping the rapidly moving fingers is absorbed through their finger pads by the anvil and this shock is reduced.

The solenoid 54 also actuates normally closed, time delay, contacts 54b, and after a predetermined time these contacts 54b open and de-energize the lines 37 by unsealing the limit switch 43. The contacts 54b reclose when their actuating solenoid is de-energized, the machine then being ready for another cycle. The contacts 54b should delay opening long enough to admit air to all of the evacuated spaces through the valves 33 and 36 and to assure time for the evacuated or sealed bag or other container to slide down the table 1 so that it is entirely free from the head unit 2. The contacts 54b delay opening until after the head rises, to assure that the limit switch 43 is open when the contacts 54b open.

The heat sealing anvil 14 is shown as being transversely convex and the heat sealing bar 16 as being transversely flat, as regards their cooperating surfaces. Therefore, as the two surfaces press together with the bag mouth between them, any liquid in the bag mouth is pressed or squeezed away from the heat sealing zone. Further, there are varying pressure zones within the heat sealing zone of the bag mouth and corresponding varying temperature zones, so as to assure a good heat seal even if the heat sealing material is critical as to temperature or pressure.

The head rises rapidly when its inside is connected with the atmosphere. Therefore, a suitable shock absorber 43a is shown connected to the parts connecting with the head. This shock absorber is arranged to slow down the rising motion of the head without providing material resistance to its closing action.

In case a container tends to stick to the table, or whenever a more positive action is desired, the pipe 34 may be connected to a source of compressed air at a location beyond the valve 36. Then when the valve 36 opens, compressed air will blow backwardly through the various container hold-down suction holes, as contrasted to these holes being only vented to the atmosphere as described previously. Thus the container is forced to release from any hold it might have on the table top.

We claim:

1. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released.

2. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the declining opening angle of the said surface being about from 30° to 45° relative to a horizontal level.

3. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the holding means being provided by at least one duct formed through the surface at a location registered beneath the container when the latter is located for coverage by the head, and means for sucking downwardly through the duct so as to draw the container against the surface.

4. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the holding means being provided by at least one duct formed through the surface at a location registered beneath the container when the latter is located for coverage by the head, and means for sucking downwardly through the duct so as to draw the container against the surface, evacuation of the head rendering inoperative, as a holding means, the suction through the duct, and means mounted in the head for mechanically holding the container against the surface when the head is closed.

5. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the surface and which is free from the sliding path of the container, means for evacuating the head when it is closed, and means for sealing the container when the head is closed, the container automatically sliding downwardly on the surface when the head is opened and the holding means is released, the holding means being provided by at least one duct formed through the surface at a location registered beneath the container when the latter is located for coverage by the head, and means for sucking downwardly through the duct so as to draw the container against the surface, the duct being positioned adjacent to the upper portion of the surface and the latter being constructed so that the container may be a bag containing fluent material and having an open sealable mouth and laid on the surface with its mouth upwardly located and the upper portion of the bag registered with the duct with the fluent material therebelow.

6. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the holding means being provided by at least one duct formed through the surface at a location registered beneath the container when the latter is located for coverage by the head, and means for sucking downwardly through the duct so as to draw the container against the surface, the duct being positioned adjacent to the upper portion of the surface and the latter being constructed so that the container may be a bag containing fluent material and having an open sealable mouth and laid on the surface with its mouth upwardly located and the upper portion of the bag registered with the duct with the fluent material therebelow, evacuation of the head rendering inoperative, as a holding means, the suction through the duct, and fingers mounted in the head and positioned to press against the upper portion of the bag when the head is closed.

7. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the machine being adapted for use with containers having heat sealable mouth portions, the said surface including a transversely substantially horizontal anvil bar on which a container's mouth portion may be rested, the said holding means being provided by a plurality of ducts formed downwardly through the anvil bar and means for sucking downwardly through the ducts to draw the mouth portion thereagainst, and the said sealing means comprising a heat sealing bar and means for mounting this bar and for pressing the bar towards the anvil when the head is closed.

8. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the machine being adapted for use with containers having heat sealable mouth portions, the said surface including a transversely substantially horizontal anvil bar on which a container's mouth portion may be rested, the said holding means being provided by at least one duct opening downwardly through the surface at a position adjacent to the anvil bar and means for sucking downwardly through the duct, the said sealing means comprising a heat sealing bar and means for mounting this bar and for pressing the bar towards the anvil when the head is closed.

9. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the machine being adapted for use with containers having heat sealable mouth portions, the said surface including a transversely substantially horizontal anvil bar on which a container's mouth portion may be rested and a heat sealing bar and means for mounting the bar to press it towards the anvil bar, one of the bars being flat transverse to its length and the other bar being substantially convex transverse to its length.

10. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the holding means being provided by at least one duct formed through the surface at a location registered beneath the container when the latter is located for coverage by the head, and means for sucking downwardly through the duct so as to draw the container against the surface, the means for evacuating the head and the means for sucking through the duct being pneumatically independent of each other, and means for closing the duct when the means for evacuating the head is actuated.

11. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the holding means being provided by at least one duct formed through the surface at a location registered beneath the container when the latter is located for coverage by the head, and means for sucking downwardly through the duct so as to draw the container against the surface, evacuation of the head rendering inoperative, as a holding means, the suction through the duct, and means mounted in the head for mechanically holding the container against the surface when the head is closed, the means for evacuating the head and the means for sucking through the duct being pneumatically independent of each other, and means for closing the duct when the means for evacuating the head is actuated.

12. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the holding means being provided by at least one duct formed through the surface at a location registered beneath the container when the latter is located for coverage by the head, and means for sucking downwardly through the duct so as to draw the container against the surface, the means for evacuating the head and the means for sucking through the duct being pneumatically independent of each other, and means for closing the duct when the means for evacuating the head is actuated, and automatic means for sequentially actuating the means for closing the duct and thereafter actuating the head evacuating means.

13. A container evacuating and sealing machine including structure forming an upwardly facing declining surface on which the container gravitationally slides downwardly due to the declination, releasable means for holding the container stationary on the surface, an open-bottomed hollow head constructed to cover the container held by said means on the declining surface, means for mounting the head so it may be opened and closed relative to said surface and which is free from the sliding path of the container, means for evacuating the head when it is closed, and means for sealing the container when the head is closed, the container automatically sliding downwardly on the surface when the head is opened and the holding means is released, the holding means being provided by at least one duct formed through the surface at a location registered beneath the container when the latter is located for coverage by the head, and means for sucking downwardly through the duct so as to draw the container against the surface, evacuation of the head rendering inoperative, as a holding means, the suction through the duct, and means mounted in the head for mechanically holding the container against the surface when the head is closed, the means for evacuating the head and the means for sucking through the duct being pneumatically independent of each other, and means for closing the duct when the means for evacuating the head is actuated, this mechanical holding means automatically actuating upon closing of the head, and automatic means for actuating the means for closing the duct after the head is closed and for thereafter actuating the head evacuating means.

14. A container evacuating and sealing machine including a structure forming an upwardly facing surface, an open-bottomed hollow head constructed to cover the container on said surface, means for mounting the head so it may be opened and closed relative to said surface, means for evacuating the head when it is closed, and means for sealing the container when the head is closed, the machine being adapted for use with containers having heat-sealable mouth portions, the said surface including a transverse anvil bar on which a container's mouth portion may be rested, a plurality of ducts being formed downwardly through the anvil bar, and means for sucking downwardly through the ducts to draw the container's mouth portion end against the anvil, and sealing means comprising a heat-sealing bar and means for holding this bar, and for pressing the bar towards the anvil when the head is closed.

References Cited in the file of this patent

UNITED STATES PATENTS

| | | |
|---|---|---|
| 2,140,117 | Salfisberg | Dec. 13, 1938 |
| 2,551,461 | Pool et al. | May 1, 1951 |
| 2,601,020 | Hopp | June 17, 1952 |
| 2,630,955 | Moses et al. | Mar. 10, 1953 |